US007273531B2

(12) United States Patent
Jing et al.

(10) Patent No.: US 7,273,531 B2
(45) Date of Patent: Sep. 25, 2007

(54) METHOD OF MODIFYING A FLUOROPOLYMERIC SUBSTRATE AND COMPOSITE ARTICLES THEREBY

(75) Inventors: Naiyong Jing, Woodbury, MN (US); Yifan Zhang, Woodbury, MN (US); William J. Schultz, North Oaks, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 410 days.

(21) Appl. No.: 10/702,393

(22) Filed: Nov. 5, 2003

(65) Prior Publication Data

US 2005/0092429 A1 May 5, 2005

(51) Int. Cl.
*B29C 65/00* (2006.01)
*B32B 37/00* (2006.01)
(52) U.S. Cl. .................................. 156/272.2; 427/508
(58) Field of Classification Search ................ 427/508
See application file for complete search history.

(56) References Cited

U.S. PATENT DOCUMENTS

| 2,789,063 | A | 4/1957 | Purvis et al. |
| 3,254,561 | A | 6/1966 | Makas |
| 3,376,278 | A | 4/1968 | Morgan |
| 3,563,871 | A | 2/1971 | Newman et al. |
| 4,112,139 | A | 9/1978 | Shirk et al. |
| 4,164,463 | A | 8/1979 | Fang |
| 4,186,084 | A | 1/1980 | Fang |

(Continued)

FOREIGN PATENT DOCUMENTS

EP 769517 A1 * 4/1997

(Continued)

OTHER PUBLICATIONS

Küper et al., "Ablation of polytetrafluoroethylene (Teflon) with femtosecond UV excimer laser pulses", Appl. Phys. Lett., Jan. 2, 1989, 54 (1), © 1988 American Institute of Physics, pp. 4-6.

(Continued)

*Primary Examiner*—Justin R. Fischer
(74) *Attorney, Agent, or Firm*—Bradford B. Wright

(57) ABSTRACT

Fluoropolymeric substrates are modified by a photochemical process that includes at least one species having the formula

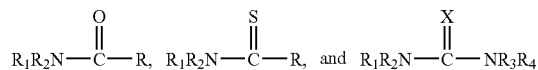

wherein: R represents hydrogen or an alkyl or cycloalkyl group having from 1 to 18 carbon atoms or an aryl, alkaryl, or aralkyl group having from 6 to 18 carbon atoms; X represents O or NH; and each of $R_1$, $R_2$, $R_3$, and $R_4$ independently represents H, an alkyl group having from 1 to 18 carbon atoms, an alkenyl group having from 1 to 18 carbon atoms, an aryl group having from 6 to 10 carbon atoms, or any two of R, $R_1$, $R_2$, $R_3$, and $R_4$ taken together represent an alkylene group having from 2 to 6 carbon atoms, with the proviso that at least one of $R_1$ and $R_2$ or at least one of $R_3$ and $R_4$ is not H.

31 Claims, 1 Drawing Sheet

U.S. PATENT DOCUMENTS

| | | | |
|---|---|---|---|
| 4,192,764 | A | 3/1980 | Madsen |
| 4,233,421 | A | 11/1980 | Worm |
| 4,261,800 | A | 4/1981 | Beckenbaugh et al. |
| 4,338,237 | A | 7/1982 | Sulzbach et al. |
| 4,567,241 | A | 1/1986 | Kitchens et al. |
| 4,613,653 | A | 9/1986 | Kitchens et al. |
| 4,775,449 | A | 10/1988 | Dumas et al. |
| 4,824,692 | A | 4/1989 | Gillick et al. |
| 4,912,171 | A | 3/1990 | Grootaert et al. |
| 5,051,312 | A | 9/1991 | Allmer |
| 5,075,427 | A | 12/1991 | Kang et al. |
| 5,086,123 | A | 2/1992 | Guenthner et al. |
| 5,262,490 | A | 11/1993 | Kolb et al. |
| 5,284,611 | A | 2/1994 | Grootaert et al. |
| 5,285,002 | A | 2/1994 | Grootaert |
| 5,320,789 | A | 6/1994 | Nishii et al. |
| 5,419,968 | A | 5/1995 | Okada et al. |
| 5,470,617 | A | 11/1995 | Nishii et al. |
| 5,478,652 | A | 12/1995 | Grootaert et al. |
| 5,580,616 | A | 12/1996 | Niino et al. |
| 5,656,121 | A | 8/1997 | Fukushi |
| 5,658,671 | A | 8/1997 | Fukushi |
| 5,734,085 | A | 3/1998 | Coggio et al. |
| 5,859,086 | A | 1/1999 | Freund et al. |
| 5,882,466 | A | 3/1999 | Grootaert et al. |
| 6,117,497 | A | 9/2000 | Murahara et al. |
| 6,255,384 | B1 | 7/2001 | McCarthy et al. |
| 6,410,667 | B1 * | 6/2002 | Moren ........................ 526/217 |
| 6,451,925 | B2 | 9/2002 | Jing |
| 6,630,047 | B2 | 10/2003 | Jing et al. |
| 6,685,793 | B2 * | 2/2004 | Jing ........................ 156/272.2 |
| 2002/0058782 | A1 * | 5/2002 | Tomihisa et al. ........... 528/501 |
| 2002/0197481 | A1 | 12/2002 | Jing et al. |
| 2003/0008935 | A1 * | 1/2003 | Yamamoto et al. ......... 522/114 |
| 2003/0077454 | A1 | 4/2003 | Jing |
| 2003/0159915 | A1 | 8/2003 | Jing et al. |
| 2003/0162022 | A1 | 8/2003 | Jing et al. |

FOREIGN PATENT DOCUMENTS

| | | |
|---|---|---|
| JP | 07-179628 | 7/1995 |
| JP | 07-179636 | 7/1995 |
| JP | 09-193164 | 7/1997 |
| JP | 2000-256488 | 9/2000 |
| WO | 06-279590 | 10/1994 |
| WO | WO96/05965 A1 | 2/1996 |

OTHER PUBLICATIONS

Siperko et al., "Chemical and physical modification of fluoropolymer surfaces for adhesion enhancement: a review", J. Adhesion Sci. Technol., 1989, vol. 3, No. 3, pp. 157-173.

Rye et al., "Depth Dependence of Alkali Etching of Poly(tetrafluoroethylene): Effect of X-ray Radiation", Langmuir, 1989, 5, pp. 1331-1334.

Barker et al., "The Electrochemical Reduction of Polytetrafluoroethylene," Electrochimica Acta, 1978, vol. 23, pp. 1107-1110.

Okada et al., "Endowment with the Wettability on the Surface of Tetrafluoroethylene-Perfluoroalkyl Vinyl Ether Copolymer by Excimer Laser Irradiation", Chemistry Letters, 1993, pp. 1637-1638, © 1993 The Chemical Society of Japan.

Révész et al., "Excimer laser induced surface chemical modification of polytetrafluoroethylene", Elsevier, Applied Surface Science, 1997, 109/110, pp. 222-226.

Meyer et al., "Metallization of Polytetrafluoroethylene (PTFE) by Means of Plasma-Enhanced Chemical Vapour Deposition", Metallized Plastics 2, Fundamental and Applied Aspects, Plenum Press, NY, 1991, pp. 121-129.

MacNicol et al., "New and unexpected reactivity of saturated fluorocarbons", Letters to Nature, Nature, Mar. 3, 1988, vol. 332, pp. 59-61.

Burdeniuc et al., "New Reaction of Saturated Fluorocarbons: Partial Reduction by $NH_3$ with Hg Photosensitization", J. Am. Chem. Soc., 1995, 117, pp. 10119-10120.

Burdeniuc et al., "Mineralization of Chlorofluorocarbons and Aromatization of Saturated Fluorocarbons by a Convenient Thermal Process", Science, Jan. 19, 1996, vol. 271, pp. 340-341.

Allmer et al., "Photochemical Modification of a Fluoropolymer Surface", Macromolecules, 1991, 24, pp. 5487-5488.

Kaprinidis et al., "Photosensitized Defluorination of Saturated Perfluorocarbons", Pergamon, Tetrahedron Letters, 1996, vol. 37, No. 14, pp. 2373-2376.

Burggraaf, "Pick Your Plastic Pipe Carefully—Chemicals, even water, can degrade some plastics", Semiconductor International, Jul. 1988, pp. 54-58.

Iqbal et al., "Polyacetylene Formed by the Benzoin Dianion Reduction of Poly(tetrafluoroethylene)", Macromolecules, 1986, 19, pp. 2992-2996.

Niino et al., "Positively charged surface potential of polymer films after excimer laser ablation: Application to selective-area electroless plating on the ablated films", Appl. Phys. Lett., May 25, 1992, 60 (21), pp. 2697-2699.

Brewis et al., "Reactions of Polytetrafluoroethylene with Electrochemically Generated Intermediates", Die Angewandte Makromolekulare Chemie, 1975, 43, (Nr. 659), pp. 191-194.

Marsella et al., "Selective Reduction of Saturated Perfluorocarbons", J. Org. Chem., 1992, 57, pp. 2856-2860.

Brewis, "Surface Analysis and Pretreatment of Plastics and Metals", Applied Science Publishers, NY, 1982, pp. 1-11.

Niino et al., "Surface modification and metallization of fluorocarbon polymers by excimer laser processing", Appl. Phys. Lett. Dec. 20, 1993, 63, (25), 3527-3529.

Clark et al., "Surface Modification by Plasma Techniques. I. The Interactions of a Hydrogen Plasma with Fluoropolymer Surfaces", Journal Polym. Sci., Polym. Chem. Ed., 1987, vol. 25, pp. 2643-2664.

Nishii et al., "Surface Modification of Polytetrafluoroethylene by KrF-Laser Irradiation", Chemistry Letters, 1992, pp. 2089-2090, © 1992 The Chemical Society of Japan.

Nishii et al., "Surface Modification of Polytetrafluoroethylene Containing Carbonaceous Materials by KrF-Laser Irradiation", Chemistry Letters, 1993, pp. 1063-1066, © 1993 The Chemical Society of Japan.

Costello et al., "Surface Modification of Poly(tetrafluoroethylene) with Benzoin Dianion", Macromolecules, 1984, 17, pp. 2940-2942.

Kiplinger et al., "Activation of Carbon-Fluorine Bonds by Metal Complexes", Chem. Rev., 1994, vol. 94, No. 2, pp. 373-431.

Cooper et al., "Theoretical Studies of Fluorocarbons—Part III. Primary, Secondary, Tertiary and Quaternary Centres", Journal of Fluorine Chemistry, 1990, 49, pp. 421-432.

Noh et al., "Surface Modification of Poly (tetrafluoroethylene) with Benzophenone and Sodium Hydride by Ultraviolet Irradiation", Journal of Polymer Science, 1997, vol. 35, No. 8, pp. 1499-1514.

* cited by examiner

METHOD OF MODIFYING A FLUOROPOLYMERIC SUBSTRATE AND COMPOSITE ARTICLES THEREBY

BACKGROUND

Fluoropolymers are generally renowned for their chemical and physical inertness. Indeed, their excellent barrier properties and hydrophobic character have been exploited for applications such as, for example, moisture and noxious gas barriers, anti-corrosion coatings, and non-stick coatings. Examples of commonly used fluoropolymers include polytetrafluoroethylene, polyvinylidene difluoride, and copolymers of vinylidene difluoride with tetrafluoroethylene and hexafluoropropylene.

Multilayer constructions in which a fluoropolymeric substrate is bonded to a second non-fluorinated substrate have a variety of industrial applications. Such constructions find utility, for example, in fuel line hoses and related containers, hoses and gaskets for use in chemical processing, and in protective film laminates. However, non-adhesive properties of fluoropolymeric surfaces may make it difficult to obtain sufficient adhesion between layers in such composite articles.

Various conventional approaches have been used to improve adhesion to fluoropolymeric substrates, including modifying the surfaces of such substrates using harsh chemical treatments such as alkali metal reduction (e.g., using alkali metal in liquid ammonia or sodium-naphthalene in glyme), and, in the case of polyvinylidene difluoride, using concentrated alkali metal hydroxide solutions in the presence of a phase transfer catalyst. Other previous methods to improve adhesion to fluoropolymeric surfaces include radiation-processing methods such as laser induced surface modification and photochemical reduction in the presence of an organic electron donor (e.g., a primary, secondary, or tertiary amine).

Each of the above methods for modifying surfaces of fluoropolymeric substrates may have disadvantages such as, for example, cost, the need to use odiferous or noxious chemicals, and/or the formation of colors (e.g., yellow, orange, dark brown) during processing.

It would be desirable to have new methods for modifying surfaces of fluoropolymeric substrates such that they may be bonded to non-fluorinated substrates, especially if they can be practiced relatively inexpensively, without odiferous chemicals, and/or without resulting in excessive color formation.

SUMMARY

In one aspect, the present invention provides a method for preparing a composite article comprising:

providing a fluoropolymeric substrate having a surface comprising at least one fluoropolymer;

contacting at least a portion of the surface with a modifying composition comprising at least one species selected from the group consisting of wherein R represents hydrogen or an alkyl or cycloalkyl group having from 1 to 18 carbon atoms or an aryl, alkaryl, or aralkyl group having from 6 to 18 carbon atoms;

X represents O or NH; and each of $R_1$, $R_2$, $R_3$, and $R_4$ independently represents H, an alkyl group having from 1 to 18 carbon atoms, an alkenyl group having from 1 to 18 carbon atoms, an aryl group having from 6 to 10 carbon atoms, or any two of R, $R_1$, $R_2$, $R_3$, and $R_4$ taken together represent an alkylene group having from 2 to 6 carbon atoms, with the proviso that at least one of $R_1$ and $R_2$ or at least one of $R_3$ and $R_4$ is not H; and exposing at least a portion of the surface contacted by the modifying composition to actinic radiation; and bonding the exposed surface to a second substrate.

In another aspect, the present invention provides a method for modifying a surface of a fluoropolymeric substrate comprising:

providing a fluoropolymeric substrate having a surface comprising at least one fluoropolymer;

contacting at least a portion of the surface with a modifying composition comprising at least one species selected from the group consisting of wherein R represents hydrogen or an alkyl or cycloalkyl group having from 1 to 18 carbon atoms or an aryl, alkaryl, or aralkyl group having from 6 to 18 carbon atoms;

X represents O or NH; and each of $R_1$, $R_2$, $R_3$, and $R_4$ independently represents H, an alkyl group having from 1 to 18 carbon atoms, an alkenyl group having from 1 to 18 carbon atoms, an aryl group having from 6 to 10 carbon atoms, or any two of R, $R_1$, $R_2$, $R_3$, and $R_4$ taken together represent an alkylene group having from 2 to 6 carbon atoms, with the proviso that at least one of $R_1$ and $R_2$ or at least one of $R_3$ and $R_4$ is not H; and exposing at least a portion of the surface contacted by the modifying composition to actinic radiation, wherein the actinic radiation passes through at least a portion of the substrate prior to contacting the modifying composition.

In yet another aspect, the present invention provides a method for modifying a surface of a fluoropolymeric particle comprising:

providing a fluoropolymeric substrate having a surface comprising at least one fluoropolymer;

contacting at least a portion of the surface with a modifying composition comprising at least one species selected from the group consisting of wherein R represents hydrogen or an alkyl or cycloalkyl group having from 1 to 18 carbon atoms or an aryl, alkaryl, or aralkyl group having from 6 to 18 carbon atoms;

X represents O or NH; and each of $R_1$, $R_2$, $R_3$, and $R_4$ independently represents H, an alkyl group having from 1 to 18 carbon atoms, an alkenyl group having from 1 to 18 carbon atoms, an aryl group having from 6 to 10 carbon atoms, or any two of R, $R_1$, $R_2$, $R_3$, and $R_4$ taken together represent an alkylene group having from 2 to 6 carbon atoms, with the proviso that at least one of $R_1$ and $R_2$ or at least one of $R_3$ and $R_4$ is not H; and exposing at least a portion of the surface contacted by the modifying composition to actinic radiation.

As used herein, the terms:

"actinic radiation" refers to electromagnetic radiation having at least one wavelength in a range of from at least 200 nanometers up to and including 320 nanometers (i.e., nm);

"Delta E*" refers to the quantity:

$$\sqrt{(L^*_{es}-L^*_s)^2+(a^*_{es}-a^*_s)^2+(b^*_{es}-b^*_s)^2}$$

where $L^*_{es}$, $a^*_{es}$, and $b^*_{es}$ are the CIE L*a*b* color coordinates of the exposed surface of the fluoropolymeric substrate and $L^*_s$, $a^*_s$, and $b^*_s$ are the CIE L*a*b* color coordinates of the unexposed surface of the fluoropolymeric substrate. In general, a color difference (Delta E*) of less than about two Delta E* units is essentially indiscernible by visual observation;

"fluoropolymer" refers to a polymer comprising at least 20 percent by weight fluorine, based on the total weight of the polymer; and "fluoropolymeric substrate" refers to a substrate comprising at least one fluoropolymer.

DETAILED DESCRIPTION

Fluoropolymeric substrates comprise one or more fluoropolymers, and generally have one or more surfaces. Useful fluoropolymers include, for example, polytetrafluoroethylene, copolymers of tetrafluoroethylene and hexafluoropropylene, tetrafluoroethylene-perfluoro(alkyl vinyl ether) copolymers (e.g., tetrafluoroethylene-perfluoro(propyl vinyl ether), polyvinyl fluoride, polyvinylidene difluoride, and copolymers of vinyl fluoride, chlorotrifluoroethylene, and/or vinylidene difluoride (i.e., VDF) with one or more ethylenically unsaturated monomers such as alkenes (e.g., ethylene, propylene, butylene, and 1-octene), chloroalkenes (e.g., vinyl chloride and tetrachloroethylene), chlorofluoroalkenes (e.g., chlorotrifluoroethylene, 3-chloropentafluoropropene, dichlorodifluoroethylene, and 1,1-dichlorofluoroethylene), fluoroalkenes (e.g., trifluoroethylene, tetrafluoroethylene (i.e., TFE), 1-hydropentafluoropropene, 2-hydropentafluoropropene, hexafluoropropylene (i.e. HFP), and vinyl fluoride), perfluoroalkoxyalkyl vinyl ethers (e.g., $CF_3OCF_2CF_2CF_2OCF=CF_2$); perfluoroalkyl vinyl ethers (e.g., $CF_3OCF=CF_2$ and $CF_3CF_2CF_2OCF=CF_2$), perfluoro-1,3-dioxoles such as those described in U.S. Pat. No. 4,558,142 (Squire), fluorinated diolefins (e.g., perfluorodiallyl ether or perfluoro-1,3-butadiene), and combinations thereof.

The fluoropolymer may be melt-processable, for example, as in the case of polyvinylidene difluoride; copolymers of tetrafluoroethylene, hexafluoropropylene, and vinylidene difluoride (e.g., those marketed by Dyneon, LLC under the trade designation "THV"); copolymers of tetrafluoroethylene and hexafluoropropylene; and other melt-processable fluoroplastics; or the fluoropolymer may not be melt-processable, for example, as in the case of polytetrafluoroethylene, copolymers of TFE and low levels of fluorinated vinyl ethers), and cured fluoroelastomers.

One useful fluoropolymer includes monomeric units derived from at least TFE and VDF in which the amount of VDF is at least 0.1, 3, or 10 percent by weight, but less than 15 or 20 percent by weight, with the remainder being TFE derived monomeric units.

Useful fluoropolymers include those copolymers having HFP and VDF monomeric units, for example, those copolymers in which the amount of VDF monomeric units is at least 0.1, 3, or 10 percent by weight, but less than 15 or 20 percent by weight, with the remainder of the polymer weight being HFP monomeric units.

Useful fluoropolymers also include copolymers of HFP, TFE, and VDF (i.e., THV). These polymers may have, for example, VDF monomeric units in a range of from at least about 2, 10, or 20 percent by weight up to 30, 40, or even 50 percent by weight, and HFP monomeric units in a range of from at least about 5, 10, or 15 percent by weight up to about 20, 25, or even 30 percent by weight, with the remainder of the weight of the polymer being TFE monomeric units. Examples of commercially available THV polymers include those marketed by Dyneon, LLC under the trade designations "DYNEON THV 2030G FLUOROTHERMOPLASTIC", "DYNEON THV 220 FLUOROTHERMOPLASTIC", "DYNEON THV 340C FLUOROTHERMOPLASTIC", "DYNEON THV 415 FLUOROTHERMOPLASTIC", "DYNEON THV 500A FLUOROTHERMOPLASTIC", "DYNEON THV 610G FLUOROTHERMOPLASTIC", or "DYNEON THV 810G FLUOROTHERMOPLASTIC".

Useful fluoropolymers also include copolymers of ethylene, TFE, and HFP. These polymers may have, for example, ethylene monomeric units in a range of from at least about 2, 10, or 20 percent by weight up to 30, 40, or even 50 percent by weight, and HFP monomeric units in a range of from at least about 5, 10, or 15 percent by weight up to about 20, 25, or even 30 percent by weight, with the remainder of the weight of the polymer being TFE monomeric units. Such polymers are marketed, for example, under the trade designation "DYNEON FLUOROTHERMOPLASTIC HTE" (e.g., "DYNEON FLUOROTHERMOPLASTIC HTE X 1510" or "DYNEON FLUOROTHERMOPLASTIC HTE X 1705") by Dyneon, LLC.

Additional commercially available vinylidene difluoride-containing fluoropolymers include, for example, those fluoropolymers having the trade designations; "KYNAR" (e.g., "KYNAR 740") as marketed by Atofina, Philadelphia, Pa.; "HYLAR" (e.g., "HYLAR 700") as marketed by Ausimont USA, Morristown, N.J.; and "FLUOREL" (e.g., "FLUOREL FC-2178") as marketed by Dyneon, LLC.

Commercially available vinyl fluoride fluoropolymers include, for example, those homopolymers of vinyl fluoride marketed under the trade designation "TEDLAR" by E.I. du Pont de Nemours & Company, Wilmington, Del.

Useful fluoropolymers also include copolymers of tetrafluoroethylene and propylene (TFE/P). These copolymers may have, for example, TFE monomeric units in a range of from at least about 20, 30 or 40 percent by weight up to about 50, 65, or even 80 percent by weight, with the remainder of the weight of the polymer being propylene monomeric units. Such polymers are commercially available, for example, under the trade designations "AFLAS" (e.g., "AFLAS TFE ELASTOMER FA 100H", "AFLAS

TFE ELASTOMER FA 150C", "AFLAS TFE ELASTOMER FA 150L", or "AFLAS TFE ELASTOMER FA 150P") as marketed by Dyneon, LLC, or "VITON" (e.g., "VITON VTR-7480" or "VITON VTR-7512") as marketed by E.I. du Pont de Nemours & Company, Wilmington, Del.

Useful fluoropolymers also include copolymers of ethylene and TFE (i.e., "ETFE"). These copolymers may have, for example, TFE monomeric units in a range of from at least about 20, 30 or 40 percent by weight up to about 50, 65, or even 80 percent by weight, with the remainder of the weight of the polymer being propylene monomeric units. Such polymers may be obtained commercially, for example, as marketed under the trade designations "DYNEON FLUOROTHERMOPLASTIC ET 6210J", "DYNEON FLUOROTHERMOPLASTIC ET 6235", or "DYNEON FLUOROTHERMOPLASTIC ET 6240J" by Dyneon, LLC.

Fluoropolymers can be prepared using emulsion polymerization techniques as described, for example, in U.S. Pat. No. 4,338,237 (Sulzbach et al.) or U.S. Pat. No. 5,285,002 (Grootaert), the disclosures of which are incorporated herein by reference.

Fluoropolymeric substrates may be provided in any form (e.g., film, tape, sheet, web, beads, particles, or as a molded or shaped article) as long as it is possible for an effective amount of actinic radiation to reach a surface of the fluoropolymeric substrate that is in contact with the modifying solution. The fluoropolymeric substrate may comprise a composite film having two or more layers.

The modifying composition comprises at least one species selected from the group consisting of wherein R represents hydrogen or an alkyl or cycloalkyl group having from at least one carbon atom up to 4, 6, 8, or even as many as 18 carbon atoms or an aryl, alkaryl, or aralkyl group having from 6, 10 or 12 carbon atoms up to 14, 16, or even as many as 18 carbon atoms; X represents O or NH; and each of $R_1$, $R_2$, $R_3$, and $R_4$ independently represents H, an alkyl group having from 1 to 18 carbon atoms (e.g., a linear or branched alkyl group having from at least one carbon atom up to 4, 6, 8, or even as many as 18 carbon atoms), an alkenyl group having from 1 to 18 carbon atoms (e.g., a linear or branched alkenyl group having from at least one carbon atom up to 4, 6, 8, or even as many as 18 carbon atoms), an aryl group having from 6 to 10 carbon atoms, or any two of R, $R_1$, $R_2$, $R_3$, and $R_4$ taken together represent an alkylene group having 2, 3, 4, 5 or 6 carbon atoms, with the proviso that at least one of $R_1$ and $R_2$ or at least one of $R_3$ and $R_4$ is not H.

In general, low molecular weight species are more desirable than their higher molecular weight counterparts. This is due in part to the higher weight fraction of the chromophore in the lower molecular weight species, and also due do their physical properties (e.g., melting point).

Examples of species having the formula include amides such as N,N-dimethylacetamide, N,N-dimethylbenzamide, N-octadecyl-N-methylacetamide, N-phenyl-N-ethylacetamide, N-methyl-N-ethylhexanamide, N,N-dimethylformamide, N,N-diethylformamide, N,N-diisopropylformamide, N,N-dibutylformamide, N,N-dioctylformamide, N,N-dihexylformamide, N,N-dimethylpropionamide, N-methyl-N-vinylacetamide, N-methylformanilide, and 1,1,3,3-tetramethylguanidine; lactams such as N-methylpyrrolidone and N-ethylcaprolactam; and amides derived from carboxylic acids and cycloaliphatic amines such as N-acetylpiperidine, and N-propionylpyrrolidine, 1-pyrrolidinecarboxaldehyde, 1-methyl-2-pyrrolidinone, and 1-methyl-2-piperidone.

Examples of species having the formula include acyclic thioamides such as N,N-dimethylthioacetamide, N-methyl-N-ethylthiohexanamide, N,N-dimethylthioformamide, N,N-dioctylthioformamide, N,N-dihexylthioformamide, N-octadecyl-N-methylthioacetamide, N-methylthioacetamide, N-phenyl-N-ethylthioacetamide, and N-N-diethylthioformamide; thiolactams such as N-methylthiopyrrolidone and N-ethylthiocaprolactam; and thioamides derived from thiocarboxylic acids and cycloaliphatic amines such as N-thioacetylpiperidine, and N-thiopropionylpyrrolidine.

Examples of species having the formula include acyclic species such as N,N,N',N'-tetramethylurea, N,N,N',N'-tetramethylguanidine, N,N'-dimethyl-N,N'-diethylurea, N,N'-dimethyl-N,N'-diethylurea, N,N'-dimethyl-N,N'-diethylguanidine, N-methyl-N-octadecyl-N',N'-dipropylurea, 1,1-dimethylurea, 1,1-dimethylguanidine, 1,3-dimethylurea, 1,3-dimethylguanidine, 1,1-diethylurea, and 1,3-diethylurea.; and cyclic species such as, 1-ethyl-3-hexyltetrahydropyrimidin-2-one, 1,3-dimethyltetrahydropyrimidin-2-one, 1-phenyl-3-hexyltetrahydropyrimidin-2-one, 1,3-dimethylimidazolidin-2-one, 1-butyl-3-hexyltetrahydropyrimidin-2-one.

The modifying composition may optionally contain solvent that is inert relative to the other component(s) of the modifying composition and the fluoropolymeric substrate in the absence of actinic radiation. Typically, such solvents should not significantly absorb actinic radiation. Examples of solvents include organic solvents such as alcohols (e.g., methanol, ethanol, n-propanol, isopropanol, n-butanol, sec-butanol, t-butanol, iso-butanol), ketones and ketoalcohols (e.g., acetone, methyl ethyl ketone, diacetone alcohol), esters (e.g., ethyl acetate and ethyl lactate); polyhydric alcohols (e.g., ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, and trimethylolpropane ethoxylated), lower alkyl ethers (e.g., ethylene glycol monomethyl or monoethyl ether, diethylene glycol methyl or ethyl ether, and triethylene glycol monomethyl or monoethyl ether), and combinations thereof. The modifying composition may include optional additives such as, for example, thixotropes, thickeners, gelation agents, latex particles, fibers, inorganic particles, an emulsifiable phase, woven or nonwoven materials, and/or nucleophiles (i.e., species that have a preferential attraction to regions of low electron density) that may become grafted to the fluoropolymer. Examples of nucleophiles include water, hydroxide, alcohols, alkoxides, cyanide, cyanate, halide (e.g., chloride, bromide, iodide).

If solvent is present, the concentration of photochemically reactive species should typically be sufficiently high that absorption of the actinic radiation and photochemical modification of the fluoropolymeric substrate may take place. For example, the concentrations of the photochemically active species should typically be sufficiently high that the molar absorption of photochemically active species is at least 0.15 at one or more wavelengths between 200 and 320 nanometers. Further, it may be desirable in some cases that the modifying composition be substantially free (i.e., contain less than 0.1 percent by weight) of other species that are capable of absorbing actinic radiation (e.g., aromatic amines) and may interfere with present invention.

The method of the present invention is typically a relatively simple process. For example, preparation of the modifying composition typically involves combining the components with mixing, optionally with heating. The modifying composition may be brought into physical contact with the surface of the fluoropolymeric substrate by immersion or conventional coating techniques such as, for example, dip coating, bar coating, spraying (including inkjet printing), rod coating, curtain coating, knife coating, roll coating, or gravure coating.

Depending on the choice of photochemically active species, solvent, and fluoropolymeric substrate, differing surface modifications may be obtained.

Typically, the actinic radiation has sufficient intensity and wavelength such that such modification occurs within less than 15 minutes, for example, less than 10 minutes, less than 5 minutes, or even less than 1 minute.

Useful sources of actinic radiation may emit electromagnetic radiation over a broad range of wavelengths, and may include wavelengths that are not actinic in nature (e.g., wavelengths greater than 320 nm). Since UVA radiation is typically not effectively absorbed by the species as previous defined, it is preferable that the source of actinic radiation has a spectral energy distribution wherein the maximum spectral energy of the actinic radiation, occurs at a wavelength of less than or equal to 290 nm. Suitable sources of actinic radiation include mercury lamps, for example, low-pressure mercury (maximum intensity at 254 nm) and medium-pressure mercury arc lamps; xenon arc lamps, carbon arc lamps; tungsten filament lamps; lasers, for example, excimer lasers; microwave-driven lamps (e.g., those marketed by Fusion UV Systems of Rockville, Md. (including H-type bulbs)); flash lamps, for example, and xenon flash lamps.

The duration of exposure to actinic radiation may be from less than about 1 second to 15 minutes or more, depending upon the absorption parameters and specific processing conditions used. In embodiments of the invention, wherein the polymeric substrate is transparent or translucent, actinic radiation may be advantageously directed to the modifying composition/fluoropolymeric substrate interface by passing through at least a portion of the fluoropolymeric substrate. For such processes in which the actinic radiation is generated by low-pressure mercury lamps having UVC intensity levels of 10 to 40 milliwatts per square centimeter (10 to 40 millijoules/second-centimeter$^2$), exposure times of less than 20 seconds may often be achieved.

The process may be run in any apparatus suitable for containing the fluoropolymeric substrate and the modifying solution. If the fluoropolymeric substrate is easily coated with the modifying solution, the coated fluoropolymeric substrate may be directly exposed to the actinic radiation.

In the case of transparent or translucent fluoropolymeric substrates, the actinic radiation may be directed through the fluoropolymeric substrate prior to passing through the modifying solution.

By masking or blocking actinic radiation from a portion of the fluoropolymeric substrate surface (or by using a focused beam, for example, a laser beam), it is possible to create patterns on the polymeric substrate surface consisting of modified and unmodified surface. Of course, the unmodified surface will exist where the surface was not exposed to actinic radiation.

In some embodiments of the present invention, more than one surface of a fluoropolymeric substrate (e.g., opposite sides of a fluoropolymeric film) may be modified, for example, using a simultaneous or sequential process.

Varying degrees of modification of the exposed surface of the fluoropolymer substrate may be achieved by varying the intensity of the actinic radiation or the exposure time. For example, after exposure to actinic radiation, the static contact angle of the surface with deionized water at 23° C. may be at least 10, 20, 30, or even at least 40 degrees less than the static contact angle with deionized water at 23° C. of the surface prior to exposure to actinic radiation in the presence of the modifying composition. The degree of surface modification may be determined by various conventional surface analysis techniques including, but not limited to, attenuated total internal reflectance infrared spectroscopy and Electron Scattering for Chemical Analysis (ESCA), as well as contact angle measurements.

Advantageously, methods according to the present invention may be typically practiced at or near ambient temperature, although higher or lower temperatures may also be utilized. Further, the methods of the present invention are typically characterized by lower odor and color generation than processes that employ organic tertiary amines. Accordingly, useful degrees of surface modification may be typically achieved according to the present invention with little or no observable color change to the unaided eye, typically corresponding to a CIE L*a*b* color change of less than or equal to three, two, or even less than one Delta E*.

Patterned surface modification may be obtained, for example, by image-wise filtering the actinic radiation or laser writing such that different intensities of actinic radiation are obtained over different parts of the polymeric substrate surface.

Fluoropolymeric substrates having surfaces modified according to various aspects of the invention may be used to bind or absorb various species such as, for example, biologically active molecules, electrolessly plated metal films, and adhesives (including pressure-sensitive adhesives). Since by masking a portion of the actinic radiation the methods of the invention may be used to produce patterns in an image-wise manner on the polymeric substrate, they may be useful in printing processes, and in the manufacture of electronic articles.

Figure 1:
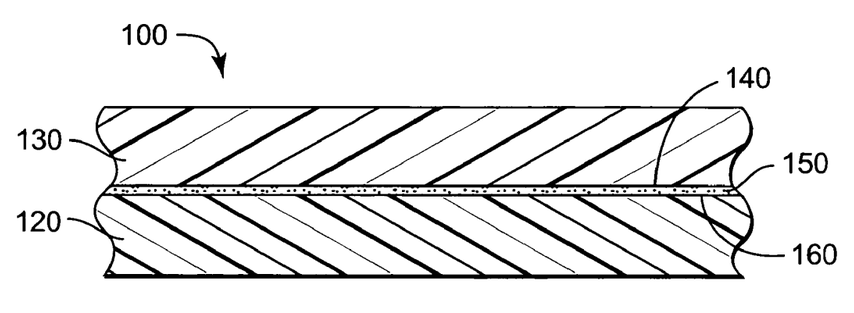
The drawing is a cross-sectional side view of an exemplary composite article according to the present invention.

Once a surface of the fluoropolymeric substrate is modified, it may be bonded to a second substrate. Such bonding may be accomplished, for example, using glue or adhesive (e.g., pressure-sensitive, thermosetting, hot melt) and/or by laminating under pressure and/or with heating using conventional methods, and resulting in a composite article as shown in the drawing, wherein composite article 100 comprises a fluoropolymer substrate 120 having a modified surface 160, which contacts optional adhesive layer 150 and surface 140 of second substrate 130.

Suitable heat sources for bonding include, for example, ovens, heated rollers, heated presses, infrared radiation sources, flame, and the like. Suitable pressure for bonding may be provided by, for example, presses, nip rollers, and the like. The necessary amounts of heat and pressure will depend on the specific materials to be bonded, and is typically easily determined by empirical methods.

In some instances, it may be desirable to rinse the surface of the modified polymeric substrate prior to bonding. Rinsing removes any components from the modifying solution that are not directly bonded to the fluoropolymeric substrate, and which may cause a decrease in observed adhesion.

The second substrate may be organic or inorganic, and may comprise a polymer (e.g., a fluorinated polymer such as those described herein above or a non-fluorinated polymer), metal, glass, other solid material, or a combination thereof. For example, the second substrate may be a polymer film, and may have polar groups on its surface and that aid in forming a strong adhesive bond. Polar groups may be introduced by conventional techniques including, for example, corona treatment and/or chemical modification.

Examples of non-fluorinated polymers include thermoplastic polymers such as polyamides; polyolefins; polyethers; polyurethanes; polyesters; polyimides; polystyrenes; polycarbonates; polyketones; polyureas; acrylics; and elastomers such as acrylonitrile butadiene rubber (NBR), butadiene rubber, chlorinated and chlorosulfonated polyethylene, chloroprene, ethylene-propylene monomer (EPM) rubber, ethylene-propylene-diene monomer (EPDM) rubber, epichlorohydrin (ECO) rubber, polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber; and combinations of the foregoing.

Useful polyamides include, for example, those marketed by E.I. du Pont de Nemours and Company under the trade designation "NYLON" (e.g., "NYLON-6", "NYLON-6,6", "NYLON-11", "NYLON-12", "NYLON-6,12", "NYLON-6,9", "NYLON-4", "NYLON-4,2", "NYLON-4,6", "NYLON-7", "NYLON-8", "NYLON-6,T", "NYLON-6,1"; those marketed by Creanova, Somerset, N.J. under the trade designation "VESTAMID" (e.g., "VESTAMID L2140"); and polyether-containing polyamides such as those marketed under the trade designation "PEBAX" by Atofina, Philadelphia, Pa.

Useful polyurethanes include aliphatic, cycloaliphatic, aromatic, and polycyclic polyurethanes. These polyurethanes are typically produced by reaction of a polyfunctional isocyanate with a polyol according to conventional reaction mechanisms. Useful diisocyanates for employment in the production of a polyurethane include 4,4'-dicyclohexylmethane diisocyanate, isophorone diisocyanate, 1,6-hexamethylene diisocyanate, 1,4-cyclohexylene diisocyanate, and 4,4'-diphenylmethane diisocyanate. Combinations of one or more polyfunctional isocyanates may also be used. Useful polyols include poly(pentylene adipate) diol, polytetramethylene ether diol, polyethylene glycol, polycaprolactone diol, poly-1,2-butylene oxide glycol, and combinations thereof. Chain extenders, such as butanediol or hexanediol may also be used in the reaction. Useful commercially available urethane polymers include, for example, those marketed under the trade designation "MORTHANE" (e.g., "MORTHANE L424.167" (melt flow index=9.7), "MORTHANE PN-04", and "MORTHANE 3429") by Morton International, Seabrook, New Hampshire, and under the trade designation "X-4107" by B. F. Goodrich Company, Cleveland, Ohio.

Useful polyolefins include, for example, homopolymers of ethylene, propylene, and the like, as well as copolymers of these monomers with, for example, acrylic monomers and other ethylenically unsaturated monomers, such as vinyl acetate and higher alpha-olefins. Such polymers and copolymers may be prepared by conventional free radical polymerization or catalysis of such ethylenically unsaturated monomers. The degree of crystallinity of the polymer may vary. The polymer may, for example, be a semi-crystalline high-density polyethylene or may be an elastomeric copolymer of ethylene and propylene. Carboxylic acid, anhydride, or imide functionalities may be incorporated into the polymer by polymerizing or copolymerizing functional monomers, such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers are commercially available, for example, as marketed by DuPont Dow Elastomers, LLC, Wilmington, Del., under the trade designation "ENGAGE"); by Exxonmobil Chemical Company, Inc., Houston, Tex., under the trade designation "EXACT"; and by E. I. du Pont de Nemours and Company under the trade designation "BYNEL".

Useful acrylics include, for example, homopolymers and copolymers of acrylic acid, methyl acrylate, ethyl acrylate, acrylamide, methacrylic acid, methyl methacrylate, ethyl methacrylate, and combinations thereof.

Useful polycarbonates include, for example, aliphatic polycarbonates, such as polyester carbonates, polyether carbonates, and bisphenol A-derived polycarbonates.

Useful polyimides include, for example, polyimide polymers made from the anhydride of pyromellitic acid and 4,4'-diaminodiphenyl ether, marketed by E.I. du Pont de Nemours and Company under the trade designation "KAPTON" (e.g., "KAPTON H", "KAPTON E", and "KAPTON V").

Additional examples of commercially available non-fluorinated polymers include polyesters such as those marketed under the trade designation "SELAR" by E.I. du Pont de Nemours and Company; polycarbonates marketed under the trade designation "LEXAN" by General Electric Company, Fairfield, Conn.; polyketones having the trade designation "KADEL" marketed by Amoco Corporation, Chicago, Ill.; and polyureas marketed under the trade designation "SPECTRIM" by Dow Chemical Company, Midland, Mich.

Examples of commercially available elastomers include those marketed by Zeon Chemical, Louisville, Ky., under the trade designations "NIPOL" (e.g., "NIPOL 1052 NBR"), "HYDRIN" (e.g., "HYDRIN C2000"), and "ZETPOL"; by E.I. du Pont de Nemours and Company under the trade designations "HYPALON" (e.g., "HYPALON 48" and "VAMAC"); by R.T. Vanderbilt Company, Norwalk, Conn., under the trade designation "NORDEL EPDM"; by Bayer Corporation, Pittsburgh, Pa., under the trade designation "KRYNAC", "PERBUNAN" and "THERBAN"; by Advanced Elastomer Systems, Akron, Ohio, under the trade designation "SANTOPRENE"; and by DSM Elastomers Americas, Addis, La., under the trade designation "KELTAN".

Fluoropolymeric substrates having modified surfaces may be used, for example, in the manufacture of microfluidic devices (e.g., lab on a chip), as protective films for electronic displays (e.g., LED displays, LCD displays), for immobilizing biologically active molecules, and in the manufacture of flexible circuitry (e.g., by metallization of an image-wise modified fluoropolymeric substrate surface).

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all reagents used in the examples were obtained, or are available, from general chemical suppliers such as Sigma-Aldrich Company, Saint Louis, Miss., or may be synthesized by conventional methods. Modifying compounds MC-1 through MC-15 were obtained from Aldrich Chemical Company, Milwaukee, Wis.

In the Examples:

"B-1" refers to a 0.4-0.5 mm thick hot pressed film of an acid modified ethylene-vinyl acetate copolymer having the trade designation "BYNEL 3101" obtained from E. I. du Pont de Nemours and Company;

"FP-1" refers to a 0.3 mm thick extruded film of a copolymer of tetrafluoroethylene and hexafluoropropylene (melt flow index=7) obtained under the trade designation "FEP X 6307" from Dyneon, LLC;

"FP-2" refers to a 0.4-0.5 mm thick extruded film of a copolymer of 73.0 percent by weight TFE, 11.5 percent by weight HFP, 11.5 percent by weight VDF, and 4.0 percent by weight of perfluoropropyl vinyl ether, melting point $T_m$=222° C., melt flow index=4.8; prepared generally according to the procedure of U.S. Pat. No. 6,242,548 (Duchesne et al.);

"FP-3" refers to poly(tetrafluoroethylene) film (0.3 mm) obtained from E.I. du Pont de Nemours and Company under the trade designation "TEFLON";

"MC-1" refers to N,N-dimethylformamide (Catalog Number 15,481-4);

"MC-2" refers to N,N-dimethylacetamide (Catalog Number 15,480-6);

"MC-3" refers to N,N-diisopropylformamide (Catalog Number 22,625-4);

"MC-4" refers to 1-pyrrolidinecarboxaldehyde (Catalog Number 16,639-1);

"MC-5" refers to N,N-dimethylpropionamide (Catalog Number 25,287-5);

"MC-6" refers to N-methyl-N-vinylacetamide (Catalog Number 25,513-0);

"MC-7" refers to N-methylformanilide (Catalog Number M4,680-2);

"MC-8" refers to 1-methyl-2-pyrrolidinone (Catalog Number 44,377-8);

"MC-9" refers to N,N-dibutylformamide (Catalog Number D4,690-4);

"MC-10" refers to N,N-dimethylthioformamide (Catalog Number 16,364-3);

"MC-11" refers to 1,1,3,3-tetramethylguanidine (Catalog Number 24,176-8);

"MC-12" refers to 2-pyrrolidinone (Catalog Number 24,033-8);

"MC-13" refers to 1,1-diethylurea (Catalog Number 25,945-4);

"MC-14" refers to 1,1-dimethylurea (Catalog Number 26,139-4);

"MC-15" refers to N,N,N',N'-tetramethyl-1,4-phenylenediamine (Catalog Number 16,020-2); and "N-1" refers to a 0.3 mm thick film hot pressed of nylon-12 having a Vicat softening point of 140° C. obtained under the trade designation "VESTAMID L2140" from Creanova, Inc. of Somerset, N.J.

General Procedure for Preparation of Photochemically Modified Fluoropolymer Film Two pieces of fluoropolymer film (e.g., FP-1 or FP-2) with dimensions of one inch (2.5 cm)×2 inches (5.1 cm) were prepared. A drop of the modifying composition was placed in the center of a first piece of the fluoropolymer film. A second piece of fluoropolymer film was superimposed onto the first piece of film and primer, and the two film pieces were squeezed together by hand to form a composite structure with a layer of modifying composition sandwiched between the two pieces of fluoropolymer film.

The resultant composite structure was exposed to actinic radiation under the indicated conditions, and then the two pieces of fluoropolymer film were separated, rinsed with distilled water, and dried in air to form two pieces of photochemically modified FP-1, each piece having one photochemically modified surface. Except as indicated, in the examples below the modifying compositions were used neat.

Preparation of N-1 and B-1 Films

Polymer granules (30 grams) of N-1, or alternatively B-1, were placed between two sheets of poly(tetrafluoroethylene) and allowed to soften for 2-3 minutes at 200° C., then pressed for about 5 to 10 seconds at a pressure of 1.03 megapascals between two platens (heated at 200° C.) of a hydraulic press. The resultant hot laminated film assembly was then immediately cooled by placing it in intimate contact with a water-cooled metal platen (13-15° C.). The cooled laminated film assembly was then gradually warmed to room temperature and the poly(tetrafluoroethylene) sheets were removed resulting in films of N-1 or B-1, respectively, having a thickness of 1.5 millimeter thickness.

T-Peel Test

Peel strength of laminated film test specimens was measured generally in accordance with D1876-01 (2001) "Standard Test Method for Peel Resistance of Adhesives (T-Peel Test)". Laminated film constructions to be tested were cut into specimens one inch (2.54 cm) wide by about 2 to 2.5 inches (5 to 6.3 cm) long. A Model 1125 tester (available from Instron Corporation, Canton, Mass.) at 100 millimeters/minute crosshead speed was used as the test device. As the laminated films of the specimen were separated, the average peel strength of the middle 80 percent of the strip was measured. The values from the first 10 percent and the last 10 percent distance of the crosshead travel were omitted. If one of the laminated films tore (i.e., without separating the films at the bonding interface) the peak value of peel strength was used instead of the average peel strength. Reported T-peel strengths, calculated as the average load measured during each T-peel test divided by the width of the specimen (reported in Newtons/meter (N/m) of specimen width), represent an average of at least two measurements obtained from identical test specimens.

General Procedure for Measuring Static Contact Angle with Water

Static contact angles with deionized water (resistance>18.1 megohms) were measured at 23° C. using a video contact angle analyzer having the trade designation "VCA-2500XE" available from AST Products, Inc., Billerica, Mass. Five-microliter drops water was used for each measurement. Reported contact angle measurements in Table 1 represent the average of measurements on the opposite sides of at least three drops. Uncertainty in the contact angle measurements was estimated at ±1 degree.

ESCA Analysis

ESCA analyses reported hereinbelow were obtained using a twin-analyzer ESCA apparatus with an un-monochromatized Al source; photoemission was detected at a scattering angle of 45 degrees with respect to the surface normal, unless otherwise specified. Results are reported in terms of percent atomic content (i.e., the percentage of indicated atoms relative to the total number of atoms) of the surface analyzed.

Color Measurements

Color was measured using a color analyzer obtained from Prism Instruments, Pickering, Ontario, Canada under the trade designation "COLOR-EYE 2180". A painted white stainless steel coupon (L*=92.281, a*=−1.490, b*=0.884) was used as the background for the measurements. The transparent samples of these examples were taped onto the coupon so that the color was measured with the fluoropolymer film side facing the light source. The instrument was standardized to a black and a white calibration standard. The color was expressed in standard CIE L, a*, b* units as described hereinabove.

Comparative Example 1

A piece of photochemically modified FP-1 was placed 24 cm below a 400 watt medium pressure mercury lamp, obtained from Electro-lite Corporation, Danbury, Conn. under the trade designation "ELC4001 LIGHT CURING UNIT" for 10 minutes. The static contact angle of the irradiated surface was measured according to the General Procedure for Measuring Static Contact Angle with Water, and also analyzed by ESCA. The results are reported in Table 1.

Example 1

A piece of FP-1 was photochemically modified according to the General Procedure for Preparation of Photochemically Modified Fluoropolymer Film using MC-1 as the modifying composition. The composite construction was exposed to actinic radiation under the same conditions used in Comparative Example 1. Static contact angle measurements with water and ESCA analysis results for the resultant photochemically modified surface of the FP-1 film are reported in Table 1 (below).

TABLE 1

| | Static Contact Angle with water, | ESCA Analysis | | | | |
|---|---|---|---|---|---|---|
| | degrees | % F | % C | % O | % N | % Cl |
| Example 1 | 110 | 67 | 33 | ND | ND | ND |
| Comparative Example 1 | 60 | 33 | 55 | 4.9 | 6.3 | 0.9 |

In Table 1, "ND" means not detected.

Examples 2-25

Pieces (2.0 inches by 1.0 inch (5.1 cm by 2.5 cm)) of fluoropolymer film (i.e., FP1 or FP2) were subjected to the General Procedure for Preparation of Photochemically Modified Fluoropolymer Film using the modifying composition, temperature, and actinic radiation exposure conditions reported in Table 2. Exposure to actinic radiation was achieved by placing the coated samples at a distance of 5 cm from a bank of six 15-watt germicidal tubular lamps obtained from General Electric Company, Schenectady, N.Y. under the trade designation "GE GERMICIDAL LAMP G15T8" and arranged as a parallel array with a two-inch spacing between lamps.

For T-Peel testing a piece of each photochemically modified fluoropolymer film to be tested was laminated to a respective piece (2.0 inches by 1.0 inch (5.1 cm by 2.5 cm)) of a second polymer film (i.e., N-1 or B-1 as indicated in Table 2) using the following general procedure: The fluoropolymer film was superimposed on the second polymer film, and a strip of polytetrafluoroethylene-coated fiber sheet was inserted about 0.6 cm along one short edge between the fluoropolymer film to be tested and the second polymer film to provide non-bonded tabs to aid in the T-Peel Test. The resultant superimposed film assembly was then laminated together by heating the sheets under 150 psi (1.03 megapascals) pressure at 200° C. for 2 minutes between heated platens of a heated hydraulic press. The resultant hot laminated assembly was then immediately cooled by placing it in intimate contact with a water-cooled metal platen (13-15° C.). The laminated assembly was then gradually warmed to room temperature and the laminated assembly was tested according to the T-Peel Test.

A film of nonfluorinated material (i.e., N-1 or B-1), prepared as indicated hereinabove, was placed in contact with the photochemically modified surface of the fluoropolymer film. A small piece of silicone release liner was placed between the fluoropolymer film and the nonfluorinated film at one end (approximately 1 cm overlap) to prevent lamination at one of the ends of the film assembly thereby providing a tab for use in T-Peel testing. The film construction was placed in a hot press at 200° C. for 2 minutes at a pressure of 1.03 megapascals, and then immediately cooled by placing it in contact with a cooled platen (13° C.-15° C.). The cooled film construction was warmed to room temperature and subjected to the T-Peel Test. T-Peel strengths are reported in Table 2 (below).

TABLE 2

| Example | Modifying Composition | Exposure Time, minutes | Fluoropolymer Substrate | Nonfluorinated Substrate | T-Peel Strength, N/m |
|---|---|---|---|---|---|
| 2 | MC-1 | 5 | FP-1 | N-1 | 203.1 |
| 3 | MC-1 | 5 | FP-1 | B-1 | 140.1 |
| 4 | MC-2 | 10 | FP-1 | N-1 | 122.6 |
| 5 | MC-2 | 10 | FP-1 | B-1 | >122.6 |
| 6 | MC-2 | 5 | FP-1 | N-1 | 52.5 |
| 7 | MC-2 | 5 | FP-1 | B-1 | 52.5 |
| 8 | MC-3 | 5 | FP-1 | N-1 | 26.3 |
| 9 | MC-3 | 5 | FP-1 | B-1 | 87.6 |
| 10 | MC-4 | 10 | FP-1 | N-1 | >105.1 |
| 11 | MC-4 | 10 | FP-1 | B-1 | >70.0 |
| 12 | MC-5 | 10 | FP-1 | N-1 | >140.1 |
| 13 | MC-5 | 10 | FP-1 | B-1 | 35.0 |
| 14 | MC-6 | 10 | FP-1 | N-1 | 35.0 |
| 15 | MC-6 | 10 | FP-1 | B-1 | 43.8 |
| 16 | MC-7 | 5 | FP-1 | N-1 | 87.6 |
| 17 | MC-8 | 10 | FP-1 | N-1 | 210.1 |
| 18 | MC-8 | 10 | FP-1 | B-1 | >105.1 |
| 19 | MC-9 | 10 | FP-1 | N-1 | 52.5 |
| 20 | MC-9 | 10 | FP-1 | B-1 | 28.0 |
| 21 | MC-10 | 10 | FP-1 | N-1 | 52.5 |
| 22 | MC-10 | 10 | FP-1 | B-1 | 43.8 |
| 23 | MC-11 | 10 | FP-1 | N-1 | 10.5 |
| 24 | MC-11 | 10 | FP-1 | B-1 | >140.1 |
| 25 | MC-12, 5 weight percent in methanol | 5 | FP-1 | N-1 | >140.1 |
| 26 | MC-12, 5 weight percent in methanol | 5 | FP-2 | N-1 | >105.1 |
| 27 | MC-12, 5 weight percent in acetonitrile | 5 | FP-1 | N-1 | >105.1 |
| 28 | MC-12, 5 weight percent in acetonitrile | 5 | FP-2 | N-1 | >105.1 |

Examples 29-35

Examples 29-35 were prepared according to the procedure of Example 2, except using the modifying compositions and irradiation times indicated in Table 3, and instead of the bank of six 15-watt germicidal lamps used in Example 2, the films were exposed to the light output of a 400-watt medium pressure mercury lamp obtained from Electro-lite Corporation, Danbury, Conn. under the trade designation "ELC4001 LIGHT CURING UNIT" located at a distance of 24 cm from the composite structure.

TABLE 3

| Example | Modifying Composition | Exposure Time, minutes | Fluoropolymer Substrate | Nonfluorinated Substrate | T-Peel Strength, N/m |
|---|---|---|---|---|---|
| 29 | MC-12 | 8 | FP-1 | N-1 | 220.6 |
| 30 | MC-13, 10 weight percent in methanol | 10 | FP-1 | N-1 | >175.1 |
| 31 | MC-14, 10 weight percent in methanol | 10 | FP-1 | N-1 | >175.1 |
| 32 | MC-1 | 3 | FP-1 | N-1 | >175.1 |
| 33 | MC-3 | 3 | FP-1 | N-1 | >122.6 |
| 34 | MC-6 | 3 | FP-1 | N-1 | >175.1 |
| 35 | MC-5 | 3 | FP-1 | N-1 | 43.8 |

Examples 36-38 and Comparative Examples 2-7

Examples 36-38 were prepared according to the procedure of Example 2, except using the modifying compound and exposure conditions indicated in Table 4. The CE L*a*b* color coordinates of unmodified fluoropolymeric films (i.e., Comparative Examples 2, 4, and 6) photochemically modified films are reported in Table 4 (below).

TABLE 4

| Example | Modifying Compound | Fluoropolymer Film | Exposure, minutes | L* | a* | b* | Delta E* |
|---|---|---|---|---|---|---|---|
| Comparative Example 2 | none | FP-1 | 0 | 90.08 | −1.24 | 1.20 | 0 |
| 36 | MC-1 | FP-1 | 15 | 90.07 | −1.25 | 1.42 | 0.22 |
| Comparative Example 3 | MC-13 | FP-1 | 10 | 89.67 | −1.34 | 2.37 | 1.24 |
| Comparative Example 4 | none | FP-2 | 0 | 91.32 | −1.49 | 0.97 | 0 |
| 37 | MC-1 | FP-2 | 15 | 90.83 | −1.41 | 0.73 | 0.55 |
| Comparative Example 5 | MC-13 | FP-2 | 10 | 88.60 | −1.71 | 5.27 | 2.69 |
| Comparative Example 6 | none | FP-3 | 0 | 90.88 | −1.41 | 0.66 | 0 |
| 38 | MC-1 | FP-3 | 10 | 89.99 | −1.33 | 1.79 | 1.44 |
| Comparative Example 7 | MC-13 | FP-3 | 10 | 87.35 | −1.24 | 7.07 | 7.32 |

In Table 4, Delta E* was calculated as the difference in color between the unmodified surface and the photochemically modified surface for the given film.

Examples 39-49 and Comparative Example 8

Example 36 was repeated except that the modifying compositions indicated in Table 5 were used in place of MC-1. The visually observed color of the modified pieces of film is reported in Table 5 (below).

TABLE 5

| Example | Modifying Composition | Exposure Time, minutes | Visually Observed Color |
|---|---|---|---|
| Comparative Example 3 | MC-16 | 10 | yellow |
| 39 | MC-2 | 10 | colorless |
| 40 | MC-3 | 5 | colorless |
| 41 | MC-4 | 10 | colorless |
| 42 | MC-5 | 10 | colorless |
| 43 | MC-6 | 10 | colorless |
| 44 | MC-7 | 5 | colorless |
| 45 | MC-8 | 10 | colorless |
| 46 | MC-9 | 10 | colorless |
| 47 | MC-10 | 10 | colorless |
| 48 | MC-11 | 10 | colorless |
| 49 | MC-12 | 5 | colorless |

Variuos unforeseeable modifications and alterations of this invention may be made by those skilled in the art without departing from the scope and spirit of this invention, and it should be understood that this invention is not to be unduly limited to the illustrative embodiments set forth herein.

What is claimed is:

1. A method for preparing a composite article comprising:
providing a fluoropolymeric substrate having a surface comprising at least one fluoropolymer;
contacting at least a portion of the surface with a modifying composition comprising at least one species selected from the group consisting of wherein
R represents hydrogen or an alkyl or cycloalkyl group having from 1 to 18 carbon atoms or aryl, alkaryl, or aralkyl group having from 6 to 18 carbon atoms;
X represents O or NH; and
each of $R_1$, $R_2$, $R_3$, and $R_4$ independently represents H, an alkyl group having from 1 to 18 carbon atoms, an alkenyl group having from 1 to 18 carbon atoms, an aryl group having from 6 to 10 carbon atoms, or any two of R, $R_1$, $R_2$, $R_3$, and $R_4$ taken together represent an alkylene group having from 2 to 6 carbon atoms, with the proviso that at least one of $R_1$ and $R_2$ or at least one of $R_3$ and $R_4$ is not H; and
exposing at least a portion of the surface contacted by the modifying composition to actinic radiation and photochemically modifying said at least a portion of the surface contacted by the modifying composition; and
bonding the photochemically modified surface to a second substrate.

2. A method according to claim 1, further comprising at least partially removing the modifying composition from the exposed surface prior to bonding the exposed surface.

3. A method according to claim 1, wherein R represents hydrogen or an alkyl or cycloalkyl group having from 1 to 6 carbon atoms, and each $R_1$ and $R_2$ independently represents an alkyl group having from 1 to 4 carbon atoms, an alkenyl group having from 1 to 4 carbon atoms, an aryl group having from 6 to 10 carbon atoms, or $R_1$ and $R_2$ taken together represent an alkylene group having from 4 to 6 carbon atoms.

4. A method according to claim 1, wherein R represents hydrogen, and each $R_1$ and $R_2$ independently represents an alkyl group having from 1 to 4 carbon atoms, or $R_1$ and $R_2$ taken together represent an alkylene group having from 2 to 4 carbon atoms.

5. A method according to claim 1, wherein $R_1$ and $R_2$ represent methyl and R represents H.

6. A method according to claim 1, wherein the modifying composition comprises at least one compound having the formula:

7. A method according to claim 1, wherein the modifying composition comprises at least one compound having the formula:

8. A method according to claim 1, wherein the color of the exposed surface varies by less than or equal to two Delta E*.

9. A method according to claim 1, wherein after exposure to actinic radiation the static contact angle of the surface with deionized water at 23° C. is at least 40 degrees less than the static contact angle with deionized water at 23° C. of the surface prior to exposure to actinic radiation.

10. A method according to claim 1, wherein the actinic radiation passes through at least a portion of the fluoropolymeric substrate prior to contacting the modifying composition.

11. A method according to claim 1, wherein the modifying composition further comprises solvent.

12. A method according to claim 1, wherein the spectral energy maximum of the actinic radiation is at a wavelength of less than 290 nanometers.

13. A method according to claim 1, wherein the fluoropolymeric substrate comprises a film.

14. A method according to claim 1, wherein bonding comprises adhesive bonding.

15. A method according to claim 1, wherein bonding comprises laminating in the presence of at least one of heat and pressure.

16. A method according to claim 1, wherein the second substrate comprises at least one of glass or metal.

17. A method according to claim 1, wherein the second substrate comprises at least one thermoplastic polymer.

18. A method according to claim 17, wherein the thermoplastic polymer comprises at least one of polyamide or acid modified ethylene-vinyl acetate copolymer.

19. A method according to claim 1, wherein the second substrate comprises a film.

20. A method for modifying a surface of a fluoropolymeric substrate comprising:
    providing a fluoropolymeric substrate having a surface comprising at least one fluoropolymer;
    contacting at least a portion of the surface with a modifying composition comprising at least one species selected from the group consisting of wherein
    R represents hydrogen or an alkyl or cycloalkyl group having from 1 to 18 carbon atoms or an aryl, alkaryl, or aralkyl group having from 6 to 18 carbon atoms;
    X represents O or NH; and
    each of $R_1$, $R_2$, $R_3$, and $R_4$ independently represents H, an alkyl group having from 1 to 18 carbon atoms, an alkenyl group having from 1 to 18 carbon atoms, an aryl group having from 6 to 10 carbon atoms, or any two of R, $R_1$, $R_2$, $R_3$, and $R_4$ taken together represent an alkylene group having from 2 to 6 carbon atoms, with the proviso that at least one of $R_1$ and $R_2$ or at least one of $R_3$ and $R_4$ is not H; and
    exposing at least a portion of the surface contacted by the modifying composition to actinic radiation and photochemically modifying said at least a portion of the surface contacted by the modifying composition, wherein the actinic radiation passes through at least a portion of the substrate prior to contacting the modifying composition.

21. A method according to claim 20, wherein R represents hydrogen or an alkyl or cycloalkyl group having from 1 to 6 carbon atoms, and each $R_1$ and $R_2$ independently represents an alkyl group having from 1 to 4 carbon atoms, an alkenyl group having from 1 to 4 carbon atoms, an aryl group having from 6 to 10 carbon atoms, or $R_1$ and $R_2$ taken together represent an alkylene group having from 4 to 6 carbon atoms.

22. A method according to claim 20, wherein R represents hydrogen, and each $R_1$ and $R_2$ independently represents an alkyl group having from 1 to 4 carbon atoms, or $R_1$ and $R_2$ taken together represent an alkylene group having from 2 to 4 carbon atoms.

23. A method according to claim 20, wherein $R_1$ and $R_2$ represent methyl and R represents H.

24. A method according to claim 20, wherein the modifying composition comprises at least one compound having the formula:

25. A method according to claim 20, wherein the modifying composition comprises at least one compound having the formula:

26. A method according to claim 20, wherein the color of the exposed surface varies by less than or equal to two Delta E*.

27. A method according to claim 20, wherein after exposure to actinic radiation the static contact angle of the surface with deionized water at 23° C. is at least 40 degrees less than the static contact angle with deionized water at 20° C. of the surface prior to exposure to actinic radiation.

28. A method according to claim 20, wherein the modifying composition further comprises solvent.

29. A method according to claim 20, wherein the spectral energy maximum of the actinic radiation is at a wavelength of less than 290 nanometers.

30. A method according to claim 20, wherein the fluoropolymeric substrate comprises a film.

31. A method for modifying a surface of a fluoropolymeric particle comprising:

provide a fluoropolymeric substrate having a surface comprising at least one fluoropolymer;

contacting at least a portion of the surface with a modifying composition comprising at least one species selected from the group consisting of wherein R represents hydrogen or an alkyl or cycloalkyl group having from 1 to 18 carbon atoms or an aryl, alkaryl, or aralkyl group having from 6 to 18 carbon atoms;

X represents O or NH; and each of $R_1$, $R_2$, $R_3$, and $R_4$ independently represents H, an alkyl group having from 1 to 18 carbon atoms, an alkenyl group having from 1 to 18 carbon atoms, an aryl group having from 6 to 10 carbon atoms, or any two of R, $R_1$, $R_2$, $R_3$, and $R_4$ taken together represent an alkylene group having from 2 to 6 carbon atoms, with the proviso that at least one of $R_1$ and $R_2$ or at least one of $R_3$ and $R_4$ is not H; and exposing at least a portion of the surface contacted by the modifying composition to actinic radiation and photochemically modifying said at least a portion of the surface contacted by the modifying composition.

* * * * *

UNITED STATES PATENT AND TRADEMARK OFFICE
CERTIFICATE OF CORRECTION

PATENT NO. : 7,273,531 B2
APPLICATION NO. : 10/702393
DATED : September 25, 2007
INVENTOR(S) : Naiyong Jing It is certified that error appears in the above-identified patent and that said Letters Patent is hereby corrected as shown below:

Title Page:

Page 2, Column 1
Line 5, Foreign Patent Documents, before "06-279590" delete "WO" and insert
-- JP -- in place thereof.

Column 17
Line 6, delete "CE" and insert -- CIE -- in place thereof.
Line 57, delete "Variuos" and insert -- Various -- in place thereof.

Column 18
Line 34, Claim 1, before "aryl" insert -- an -- in place thereof.

Signed and Sealed this

Twenty-fifth Day of December, 2007

JON W. DUDAS
*Director of the United States Patent and Trademark Office*